June 19, 1934.　　　B. H. BROWALL　　　1,963,224
BRAKE RIGGING
Filed Oct. 15, 1930　　　3 Sheets-Sheet 3
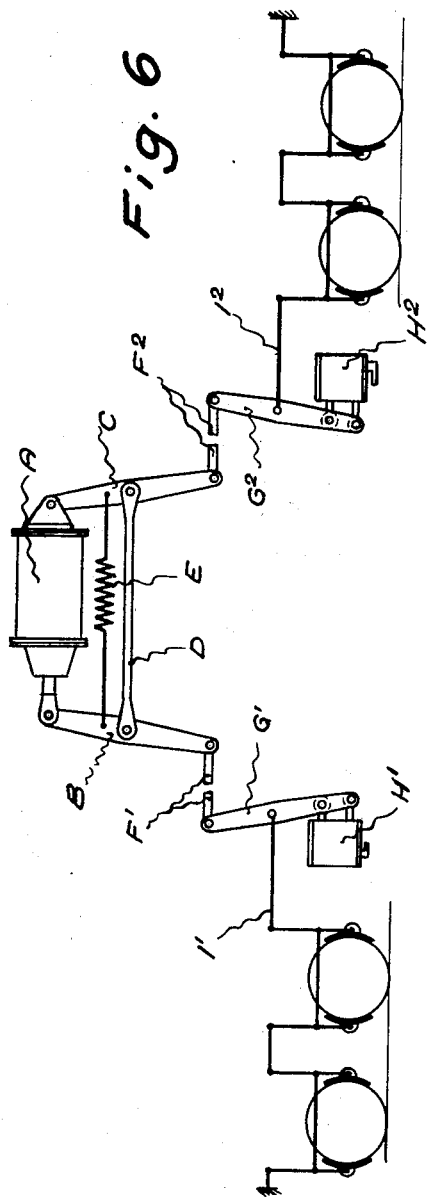
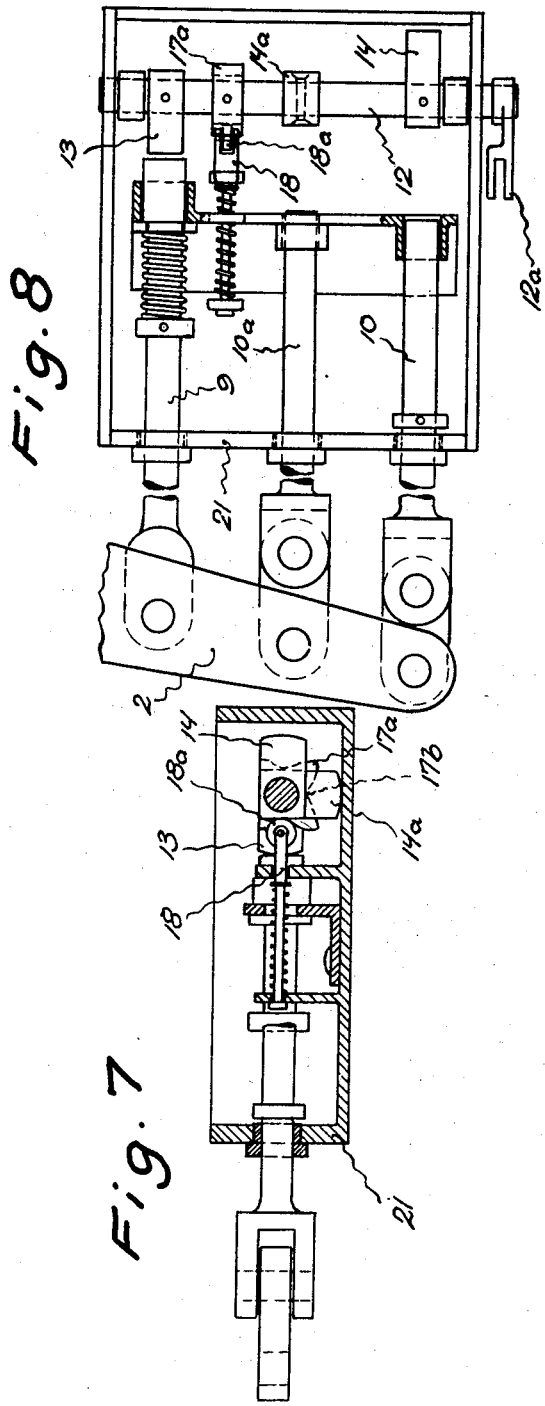
B. H. Browall
INVENTOR
By Marks & Clerk
Attys.

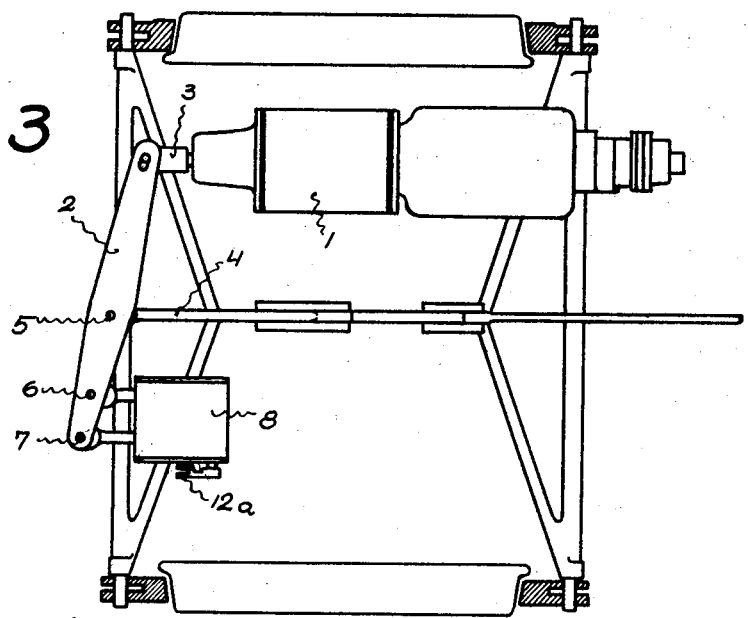
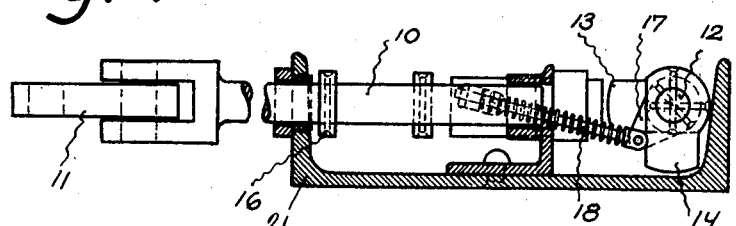
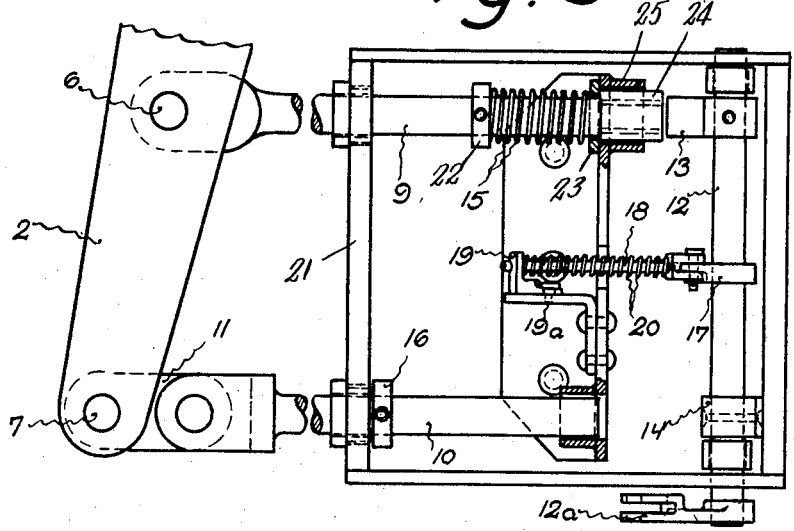

Patented June 19, 1934

1,963,224

UNITED STATES PATENT OFFICE 1,963,224

BRAKE RIGGING

Bert Henry Browall, Malmo, Sweden, assignor to Svenska Aktiebolaget Bromsregulator, Malmo, Sweden, a corporation of Sweden Application October 15, 1930, Serial No. 488,926
In Sweden December 3, 1929

13 Claims. (Cl. 188—195)

My present invention refers to improvements in brake riggings for railway cars and the like provided with means for variation of the leverage of the rigging in conformity with the load on the car.

In railway cars and the like, and for the purpose of adapting the maximal braking power according to the load on each separate car, it has previously been proposed to have resort to a brake rigging provided with means for variation of the leverage, so that it will be possible, for instance by manipulation of a handle bar or its equivalent, to reverse the brake rigging from a smaller leverage adapted for the braking of an empty car to a greater leverage adapted for the braking of a loaded car, or vice versa, and the present invention refers to improvements in brake riggings of this type.

On account of the depression of the car springs due to the weight of the load, it is practically impossible to prevent the distance between the brake shoes and the wheels from varying when unloading the car, or at the loading of an empty car, i. e. the occasions at which a variation of the rigging leverage takes place in practice, and the previously known arrangements for such purpose suffer from the disadvantage, that the intended variation of the leverage, in spite of the manipulation of control means adapted therefor, is not obtained when the slack between the brake shoes and the wheels is smaller than normal, as will be presently explained in the following. The main object of the invention is to eliminate this disadvantage.

The invention is illustrated in the accompanying drawings, wherein

Fig. 3 is a plan view of the same.

Fig. 4, in a larger scale, shows a vertical section of the apparatus for variation of the leverage, Fig. 5 is a plan view of the latter, and Fig. 6 is a diagrammatic plan view of a slightly modified form, the brake rigging being shown in plan with the wheels and adjacent parts of said rigging in elevation.

Fig. 7 shows an enlarged vertical sectional detail of a modified form of the apparatus for variation of the leverage, and Fig. 8 is a plan view of the arrangement shown in Fig. 7.

Figure 1:
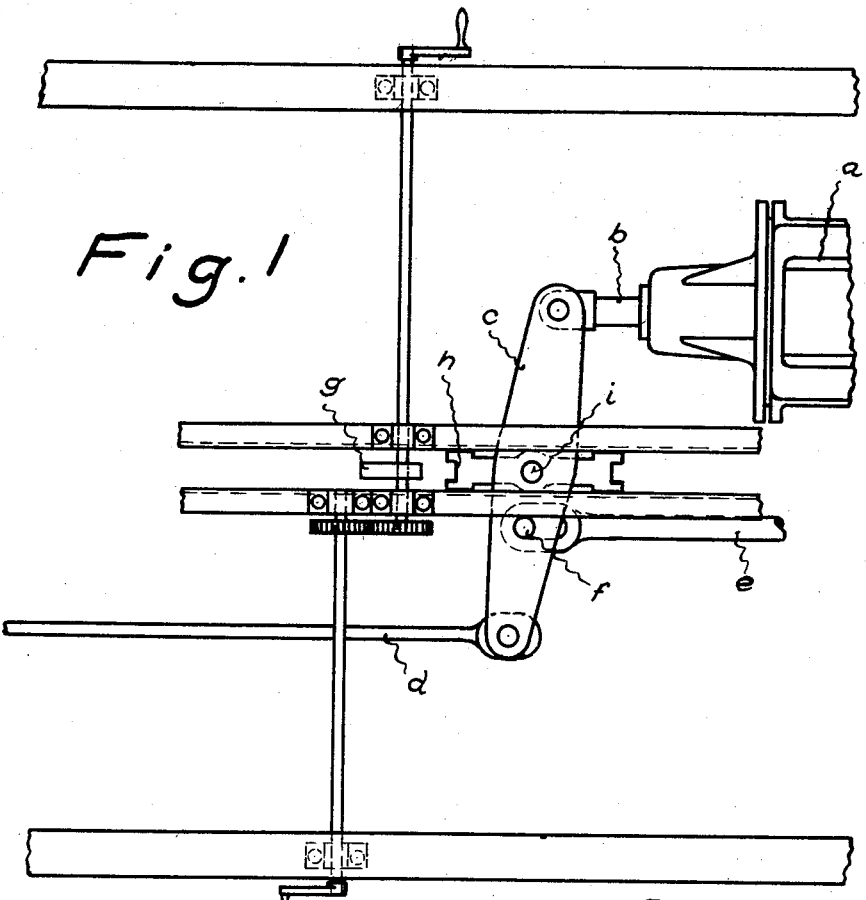
Fig. 1 is a plan view of a known arrangement for variation of the leverage set forth for a comparison with the present invention.

In the known arrangement according to Fig. 1, the reference $a$ represents the brake cylinder provided with a piston rod $b$ adapted to be actuated by the piston (not shown) within the cylinder and to be moved to the left in the figure when braking. The piston rod is connected with one end of a brake lever $c$ which at its other end is connected with a pull rod $d$ adapted to transmit the braking power to the shoes in a known manner, and at a point intermediate its ends the lever $c$ is connected with one end of a pull rod $e$, the other end of which is connected with a fixed point in the car frame.—If no other means were at hand, the lever $c$, when braking, would turn around the pivotal centre $f$ in the pull rod $e$, and thereby it would act with a certain leverage. In the present case this leverage can be assumed to be the greatest one, and it will cause a maximal braking effect corresponding to a loaded car.

If the leverage is to be varied, the brake lever $c$ must be given another pivotal centre, and in the known arrangement according to Fig. 1 this is obtained by turning of a cam disc $g$, which then comes into contact with a guide block $h$ pivotally connected with the lever $c$. Thereby the lever will be caused to turn around the pivotal centre $i$ on the guide block $h$, so that the leverage is reduced and adapted for braking of an empty car. In order to permit the lever $c$ to turn around the pivotal centre $i$, the pivot pin $f$ is mounted in an elongated slot as indicated in the drawings.

In most of the brake types in use, and especially in case of compressed air brakes, it is a general condition that the brake piston, and consequently also the piston rod $b$, when braking, shall always have a predetermined length of stroke, and with regard hereto the known device described above cannot be used without special measures. When the brake is released, the slack between the brake shoes and the wheels is not influenced in case the cam disc $g$ is brought into one of its positions or the other, but when braking, a considerably smaller length of stroke of the piston rod is obviously required for pressing the brake shoes in contact with the wheels, when the lever $c$ turns around the pivotal centre $i$ (the smaller leverage) than when it turns around the pin $f$ (the greater leverage). Consequently the length of stroke of the brake piston must be subjected to a variation in proportion to the variation of the leverage, and therefore it is impossible, even if approximately only, to satisfy the condition with regard to the constant length of stroke spoken of in the foregoing.

An attempt has been made to eliminate the above mentioned variation of the brake piston stroke by positioning the cam disc g at a certain distance from the guide block h, thus, the cam disc g even when set into operation, will not touch the guide block h so long as the brake is released. At the initiating of a braking process, the lever c will then at first turn around the pin f, whereby the guide block h is advanced towards the cam disc g. The distance between the guide block h and the cam disc g is of such a dimension that the contact between the said parts takes place immediately before the brake shoes, at the turning of the lever c around the pin f, should have been brought into contact with the wheels. In such case the brake piston would thus have travelled almost its entire normal length of stroke before the pivotal centre of the lever c, by the contact between the guide block h and the cam disc g, has been shifted over to the pin i. Thereby the very last part of the brake piston stroke only will be influenced by the change of the pivotal centre of the lever c, and thus the piston stroke will very nearly have attained its normal value when the shifting of the fulcrum occurs. In this manner the difference in the length of the brake piston stroke will be so small that it may be considered tolerable.

Nevertheless, this construction involves, however, a serious drawback.—It is obvious that in case the slack from one reason or another, for instance the reasons hinted at above, has become too small, the brake shoes will go into contact with the wheels before the brake piston has travelled its normal length of stroke, when braking. Consequently, the continued turning movement of the lever c will be prevented before the members g and h have come into contact with each other, and then the brake rigging will continue in braking around the pivotal centre f, in spite of the fact that the cam disc g has been adjusted so that its contact with the guide block would have been secured, for the purpose of shifting of the pivotal centre, in case the slack between the brake shoes and the wheels had been normal.—It will be apparent that such an action is positively intolerable in practice, as the function of the entire construction would be doubtful and uncontrollable.

It has been found that the mistake in previous constructions is that the support in the pin f is not positively removed from the lever c simultaneously with the provision of the new support for the same by means of the members g and h. The support offered by the pin f being still at hand, it is dependent on the greater or smaller length of stroke of the brake piston at each application of the brake whether the construction shall function in the desired manner or not.

The present invention eliminates the drawback referred to in the foregoing, and generally it is characterized in that both of the two supporting points or pivotal centres for the brake lever (or all of such points or centres, in case more than two of them are employed, for instance if the leverage and braking power respectively is to be adjusted also for a partially loaded car) are reversible in such a manner that one of them is positively brought into action simultaneously as the other is equally positively brought out of action. In practice the said supporting points are preferably interconnected in such a manner that the reversal of both, or all, of them is performed simultaneously and with one and the same manipulation, so that it is impossible, for instance due to carelessness, to put one of the supporting means or pivotal centres out of action without simultaneously putting another of them into action.

Figure 2:
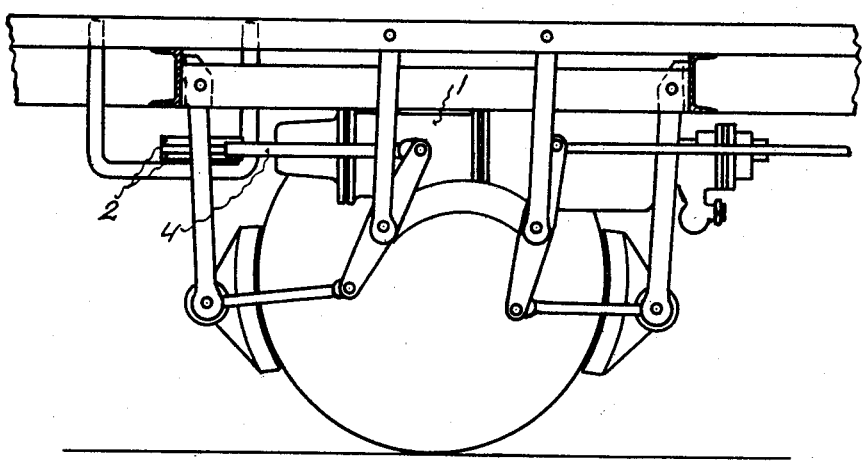
Fig. 2 is an elevation showing a brake rigging constructed according to the invention.

In the embodiment of invention illustrated in Figs. 2 and 3, the invention is shown applied to a brake rigging of a somewhat modified form, in that the brake lever connected with the piston rod is constructed as a one-armed lever only. It ought to be evident to anyone, however, that the circumstance, whether the lever is constructed with one or two arms, is without influence on the invention, as entirely in the same manner and by using exactly the same mechanical means it will be possible to shift the pivotal centres either at one end of the lever or at a point between the ends of the same.

Referring to Figs. 2 and 3, the reference 1 represents the brake cylinder, and 2 is the brake lever connected with the piston rod 3, the said brake lever 2 corresponding to the lever c in Fig. 1. At a suitable point between its ends, the brake lever 2 is hingedly connected with a pull rod 4. At its other end, the brake lever 2 is adapted to be supported at either of the rigid supporting points 6 or 7, and by shifting over the support to one or the other of these points, the leverage will be varied in the same manner as described above. The means for transmitting the braking power by means of the pull rod 4 to the brake shoes is also shown in the Figures 2 and 3, but since such means is beyond the scope of this invention, it seems superfluous specifically to explain the same in this connection. The apparatus for shifting of the supporting points has the general reference 8 in Fig. 3, and the particulars of the same are shown in the Figs. 4 and 5.

From Fig. 5 it is to be seen that the supporting points for the brake lever consist of pivot pins 6 and 7 respectively, such pins establishing a pivotal connection between the lever and each of two longitudinally slidable plunger bars 9 and 10, the connection between the pin 7 and the plunger 10 being effected by means of an intermediate link 11 for the purpose of permitting a rectilinear positive displacement of both of the plungers without tendency of jamming in their guides at the movement of the brake lever 2. Naturally, this link connection could also have been mounted between the pin 6 and the plunger 9 to the same effect, or else it may also be substituted by other means acting in an equivalent manner.

The plungers 9 and 10 are slidably mounted in a suitable framing 21, and at their displacement they are rectilinearly guided by suitable means variable in many different ways. Transversely of the direction of displacement of the plungers 9 and 10, and beyond the ends of the same is rotatably mounted a shaft 12 rigidly connected with two lugs or cams 13 and 14 positioned in line with each of the plungers, such cams forming abutments radially extending from the shaft, and when they are two in number, they are preferably positioned at an angular distance of 90°. By a suitable control mechanism which is not shown itself in the drawings but intended to be connected with the crank 12$^a$, the shaft 12 may be turned a quarter of a revolution, and thereby one or the other of the two cams may be brought into action in opposition to the corresponding plunger end, but simultaneously as one of the cams is brought into action, the other one is automatically and positively brought out of such position, and hereby the support for the plunger not intended to be used is effectively removed.

In order, when the brake is released, to keep both of the plungers as far as possible away from the shaft 12, one of the plungers, for instance the plunger 9, is acted upon by a spring 15 mounted on the plunger 9 between a collar 22 secured to the said plunger and a disk 23 slidable thereon. In the position shown in Fig. 5 the disk 23 abuts a sleeve 24 screwed on the end of the plunger 9 and sliding in a socket 25 secured to the framing 21, but when the plunger 9 is moved to the right in Fig. 5 the disk 23 abuts the said socket 25. Evidently this spring serves also the purpose of keeping the other plunger 10 away from the shaft in a corresponding manner. A collar 16 on the other plunger 10 prevents the plungers from being pushed out from their guides.—It is obvious that the spring to the same effect may also be mounted for acting upon the other plunger 10, but then it will be subjected to a greater amount of compression. The main object of the means last described is that the ends of the plungers, when the brake is released, shall not take such an inner position that they are in the path of movement of either of the cams 13 or 14, as thereby they would be able to prevent a reversal of the cams.

In order that the cams, at the reversal, shall not be able to take any intermediate position, the shaft 12, in an angular position between the cams, is provided with a crank member 17 hingedly connected with a rod 18, which is longitudinally slidable in and guided by a guide means 19 suitably mounted turnably around a pin 19ª so as to be able to take a position in correspondence with the different inclinations of the rod 18. By means of a coil spring 20 mounted around the rod 18, the crank member 17 is acted upon in such a manner that it must pass its dead centre in one direction or the other, and thereby it will prevent the cams from taking a non-desirous intermediate position the rotation of the shaft 12 being limited in the position to which it is turned through the idle cam which for this purpose abuts the adjacent flange of the channel-shaped framing 21. This means may naturally also be constructed in other suitable ways and may be adapted for permitting more than two different cam positions, in case more than two cams, or supporting points, are used.

In the positions of the members shown in Figs. 4 and 5, the cam 13 is in its acting position, the cam 14 being out of action. As the corresponding pin 6 or supporting point for the brake lever is positioned nearest to the point of connection 5 of the pull rod 4, the greater leverage is thus employed. If the cams are reversed, the cam 14 will be brought into action, the cam 13 being inoperative, and the supporting point for the brake lever 2 is then shifted over to the pin 7 so that the leverage is reduced.—It is evident without further explanation that exactly the same arrangement may also be used for shifting of the supporting points between the ends of the brake lever for instance the lever c (Fig. 1) in respect of which the points of connection i and f may be arranged in exactly the same manner as the points 6 and 7 in Fig. 3.

In Figs. 7 and 8 a slightly modified form of apparatus is shown. The only difference between this form and the form shown in Fig. 4 is that there is interposed between the plungers 9 and 10 a third plunger 10ª and between the cams 13 and 14 a third cam 14ª corresponding to the plunger 10ª. Inasmuch as in this embodiment the shaft 12 is to be rotated into three different angular positions for bringing the three cam members into action the crank 17 of Figs. 4 and 5 is replaced by a suitably shaped disk 17ª with which the spring pressed rod 18 cooperates to prevent the shaft 12 from taking nondesirous intermediate positions between the three positions in which the cams successively become operative, the rod 18 for this purpose being provided with a pivoted roller 18ª engaging any one of the notches 17ᵇ provided on the disk 17ª.

Finally it is to be noted, that the variable leverage must not by necessity be applied in connection with the brake lever c and 2 respectively connected with the brake piston rod. To the same effect it may also be applied to any other suitable lever used in the brake rigging, and naturally more than one lever in the same rigging may also be constructed for variable leverage, in case the construction of the rigging should necessitate such an arrangement.

In Fig. 6 there is disclosed a form of the invention wherein more than one of the brake levers for transmission of the braking power to the brake shoes are provided with means for alteration of the leverage of the rigging. The brake cylinder A has associated therewith a live brake lever B and a dead brake lever C, the brake levers being connected by a connecting link D while also interposed between these levers is a return spring E for the rigging. Pull rods $F^1$ and $F^2$ extend towards opposite ends of a car not shown with which the arrangement is to be associated while levers $G^1$ and $G^2$ are connected with the said pull rods and adapted for variation of the leverage through the instrumentality of the devices $H^1$, $H^2$ for accomplishing the said variation of the leverage. Pull rods $I^1$ and $I^2$ extend from the levers $G^1$ and $G^2$ to the supporting rigging for the clasp brake shoes in turn adapted for coaction with the wheels. It will be understood that this embodiment of invention is adaptable for very long cars supported at each end by a four wheel bogie, and the variable leverage at each end may be adaptable according to the amount of load at the separate ends of the car.

What I claim and desire to secure by Letters Patent is—

1. In a brake rigging of the character described, a variable leverage brake lever adapted for transmission of the braking power to the brake shoes, means for providing pivotal centres for said brake lever at different points along the length thereof, one movable abutment means for each pivotal centre and adapted to form a rigid supporting point for the same, means for putting each of said abutment means into action at will, and means for positively and effectively putting the rest of the abutment means into an inoperative position.

2. In a brake rigging according to claim 1, the additional feature that the abutment means are interconnected in such a manner that when one of the abutment means is brought into activity, the rest of them are simultaneously and automatically brought into an inoperative position.

3. In a brake rigging according to claim 1, the additional feature that the abutment means consist of cam members rigidly connected with a common shaft and positioned in angular relation around the axis of said shaft.

4. In a brake rigging according to claim 1, the additional feature that the abutment means are adapted to coact with the brake lever by the intermediary of plunger means slidably mounted in suitable guides, one end of each of said plunger means being adapted to form a pivotal connection with the brake lever.

5. In a brake rigging according to claim 1, the additional features that the abutment means are adapted to coact with the brake by the intermediary of corresponding slidable plunger means one end of which is adapted to form a pivotal connection with the brake lever, and that the abutment means are positioned in the elongation of the opposite ends of the plungers and mounted rigidly on a common shaft in angular relation around the axis of said shaft.

6. In a brake rigging of the character described, a plurality of variable leverage brake levers adapted for transmission of the braking power to the brake shoes, means for providing pivotal centres for each of said brake levers at different points along the length thereof, one movable abutment means for each pivotal centre and adapted to form a rigid supporting point for the same, means for putting each of said abutment means into action at will, and means for positively putting the rest of the abutment means for each of the said levers into an inoperative position.

7. In a brake rigging of the character described, a variable leverage brake lever adapted for transmission of the braking power to the brake shoes, means for providing two different pivotal centres for said brake lever at separate points along the length of the same, two movable abutment means each corresponding to one of said pivotal centres and adapted to form a rigid supporting point for the same, means for putting one of the said abutment means into action at will, and means for simultaneously and automatically putting the other of them into an inoperative position, and vice versa.

8. In a brake rigging of the character described, a variable leverage brake lever adapted for transmission of the braking power to the brake shoes, two plunger means adapted at their one ends to form a pivotal connection with said brake lever at different points along the length of the same, one movable abutment means provided for each of the plungers and adapted to act as a removable stopping member in the path of movement of the opposite free end of the corresponding plunger, means for alternately putting one of said abutment means into action at will, and means for simultaneously and automatically putting the other of them into an inoperative position, and vice versa.

9. In a brake rigging according to claim 8, the additional feature that the abutment means consist of cam members rigidly connected with a common shaft, which is acted upon by means adapted to prevent the shaft to come to rest in a position in which none of the cam members is in operative position.

10. In a brake rigging according to claim 8, the additional feature that one of the plunger means is adapted to form a pivotal connection with the brake lever by the intermediary of a link connection.

11. In a brake rigging according to claim 8, the additional feature that the plungers are acted upon by means permanently tending to displace them in a direction away from the abutment means, stopping means being provided for limitation of such displacement.

12. In a brake rigging of the character described, a variable leverage brake lever adapted for transmission of the braking power to the brake shoes, a framing, two plunger means positioned substantially parallel with each other and mounted longitudinally slidable in said framing, means for pivotal connection between one end of each of said plungers and the brake lever at different points along the length of the latter, a shaft mounted in the framing transversely to the plungers and beyond the ends thereof remote from the lever, two cam members rigidly connected with the shaft and each positioned in the elongation of the free end of the corresponding plunger and in an angular relation to each other around the axis of the shaft, means acting upon the shaft and adapted to prevent it from coming to rest in a position in which none of the cam members is in operative position, means acting upon the plungers and permanently tending to displace them in a direction away from the cams, and stopping means adapted for the limitation of such displacement.

13. In a brake rigging of the character described, a variable leverage brake lever partaking in the transmission of the braking power to the brake shoes, means providing a plurality of different pivotal centres for said brake lever at spaced points along the length of the same, a plurality of abutment means each corresponding to one of said pivotal centres and being movable to and from an operative position in which it forms a rigid support for the pivotal centre means corresponding thereto, and means interconnecting the said movable abutment means in such a manner that when any one of the abutment means is moved into operative position all the other ones are moved into inoperative positions.

BERT HENRY BROWALL.